(12) United States Patent
Tripathi et al.

(10) Patent No.: US 11,500,942 B2
(45) Date of Patent: Nov. 15, 2022

(54) FOCUSED AGGREGATION OF CLASSIFICATION MODEL OUTPUTS TO CLASSIFY VARIABLE LENGTH DIGITAL DOCUMENTS

(71) Applicant: Adobe Inc., San Jose, CA (US)

(72) Inventors: Ankit Tripathi, Bengaluru (IN); Tridib Roy Chowdhury, Bangalore (IN); Rahul Sharma, Bangalore (IN); Adarsh Ghagta, Bangalore (IN)

(73) Assignee: Adobe Inc., San Jose, CA (US)

( * ) Notice: Subject to any disclaimer, the term of this patent is extended or adjusted under 35 U.S.C. 154(b) by 656 days.

(21) Appl. No.: 16/434,516

(22) Filed: Jun. 7, 2019

(65) Prior Publication Data
US 2020/0387545 A1    Dec. 10, 2020

(51) Int. Cl.
*G06F 16/908*    (2019.01)
*G06N 20/00*    (2019.01)
*G06N 3/08*    (2006.01)
*G06V 30/416*    (2022.01)

(52) U.S. Cl.
CPC .......... *G06F 16/908* (2019.01); *G06N 3/08* (2013.01); *G06N 20/00* (2019.01); *G06V 30/416* (2022.01)

(58) Field of Classification Search
CPC ........ G06F 16/908; G06N 20/00; G06N 3/08; G06K 9/00469
USPC ...................................................... 707/748
See application file for complete search history.

(56) References Cited

U.S. PATENT DOCUMENTS

| | | | | |
|---|---|---|---|---|
| 8,805,840 | B1 * | 8/2014 | Joshi | G06F 7/08 707/737 |
| 9,311,568 | B1 * | 4/2016 | Feller | G06K 9/6267 |
| 10,062,039 | B1 * | 8/2018 | Lockett | G06N 3/0445 |
| 2004/0049478 | A1 * | 3/2004 | Jasper | G06F 16/35 |
| 2008/0104506 | A1 * | 5/2008 | Farzindar | G06F 16/345 707/999.1 |
| 2011/0035345 | A1 * | 2/2011 | Duan | G06Q 10/10 706/46 |
| 2015/0095770 | A1 * | 4/2015 | Mani | G06F 40/12 715/254 |
| 2016/0342681 | A1 * | 11/2016 | Kesin | G06F 16/93 |
| 2017/0364504 | A1 * | 12/2017 | Dandapat | G06F 40/279 |
| 2019/0332666 | A1 * | 10/2019 | Dadachev | G06F 40/284 |
| 2020/0293553 | A1 * | 9/2020 | Sonobe | G06F 16/285 |

* cited by examiner

*Primary Examiner* — Hosain T Alam
*Assistant Examiner* — Robert F May
(74) *Attorney, Agent, or Firm* — Keller Preece PLLC

(57) ABSTRACT

Systems, methods, and non-transitory computer-readable media are disclosed for utilizing focused aggregation of classification model outputs to classify variable length documents. For instance, the disclosed systems can utilize a classification model to determine category scores for segments from an electronic document. Furthermore, the disclosed systems can identify positive trigger segments from the segments by comparing the category scores to a threshold category score. Moreover, the disclosed systems can determine a positive trigger ratio for the target category based on the positive trigger segments and the segments. Additionally, the disclosed systems can generate an aggregated category score for the electronic document from the positive trigger segments (when the positive trigger ratio satisfies a threshold positive trigger ratio) and distribute the electronic documents to client devices based on the aggregated category score.

20 Claims, 10 Drawing Sheets

FOCUSED AGGREGATION OF CLASSIFICATION MODEL OUTPUTS TO CLASSIFY VARIABLE LENGTH DIGITAL DOCUMENTS

BACKGROUND

Recent years have seen a significant increase in storage, management, and distribution of digital content (e.g., electronic documents, digital videos, and/or digital images) across client devices utilizing computer networks. For example, conventional digital content management systems can capture or generate digital content and then distribute the digital content to individual client devices. To illustrate, conventional digital content management systems can classify electronic documents to determine document categories and then curate and distribute digital content to targeted client devices. In particular, conventional digital content management systems can operate as part of a social networking platform to select digital content to provide to a client device accessing a social networking feed based on categories associated with the digital content. Similarly, conventional digital content management systems can operate as part of a search engine in providing documents in response to search queries. Conventional systems can utilize a category associated with an electronic document to surface the electronic document in response to a search request (or within a social networking application) by comparing the category associated with the electronic document to the request and/or characteristics of a user client device.

In addition, many cloud-based systems can store and manage digital content for client devices. For example, cloud-based systems can store thousands or millions of digital content items that users can access via various client devices. Some conventional digital content management systems classify electronic documents and determine document categories to assist in managing these large digital content repositories. Specifically, some conventional digital content management systems utilize document categories to quickly locate and retrieve digital content and/or electronic documents from large digital content repositories.

Although these conventional digital content management systems classify electronic documents to determine document categories, they also have a number of significant shortcomings in relation to accuracy and efficiency of operation.

SUMMARY

The disclosure describes one or more embodiments that provide benefits and solve one or more of the foregoing or other problems in the art with systems, computer-readable media, and methods that utilize focused aggregation of classification model outputs to classify documents with different lengths (i.e., variable length documents). For example, in order to accurately and efficiently respond to different search queries, the disclosed systems can classify an electronic document with categories (e.g., category tags) based on multiple category scores for a category determined across multiple segments of the electronic document (e.g., an aggregated category score). For instance, the disclosed systems can utilize a classifier to determine category scores for segments of an electronic document. Then, the disclosed systems can identify segments that include category scores for a target category that meet a threshold category score (e.g., positive trigger segments). Moreover, if the proportion of the positive trigger segments (e.g., a positive trigger ratio) meets a threshold proportion (e.g., a threshold positive trigger ratio), the disclosed systems can focus on the positive trigger segments and determine an aggregated category score from the category scores of the positive trigger segments. If the proportion of the positive trigger segments does not meet the threshold proportion, the disclosed systems can determine an aggregated category score from all of the segments of the electronic document. Moreover, the disclosed systems can use the categories associated to the electronic document to surface the electronic document (or other digital content corresponding to the electronic document) in response to search queries and/or other requests that relate to the category.

To illustrate, the disclosed systems can utilize a neural network-based classifier to determine category scores for segments (or chunks) of an electronic document. The disclosed systems can then compare the category scores for the segments against a threshold category score to identify which segments have positive triggers for a specific category. If the proportion of segments with positive triggers for a specific category satisfies a threshold positive trigger ratio, the disclosed systems can determine an aggregated category score from the classification model outputs. Otherwise, the disclosed systems can analyze aggregate category scores from the classification model across all segments of the electronic document. Utilizing this dynamic approach, the disclosed systems can efficiently and accurately reduce false positives while identifying categories with dominant category scores across segments of an electronic document.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings in which.

DETAILED DESCRIPTION

Figure 1:
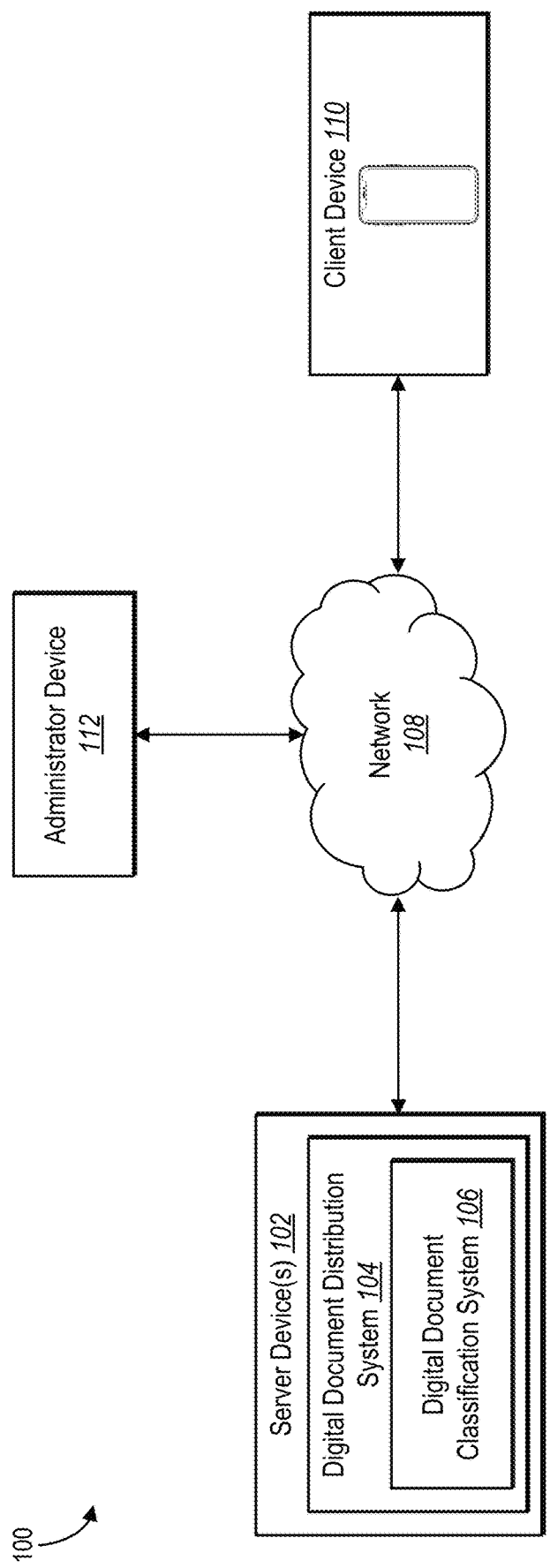
FIG. 1 illustrates a schematic diagram of an example environment in which a digital document classification system can operate in accordance with one or more embodiments.

One or more embodiments of the present disclosure include a digital document classification system that utilizes focused aggregation of classification model outputs to classify variable length documents. For instance, the digital document classification system can identify documents to provide to client devices in response to search queries or other requests by utilizing a dynamic category score aggregation approach that changes depending on the category scores for different portions of the documents. For instance, with documents where a threshold number of segments correspond to a particular category (e.g., when positive trigger segments satisfy a positive trigger ratio), the digital document classification system can emphasize category scores corresponding to those segments. With regard to documents where a threshold number of segments do not correspond to a particular category (e.g., positive trigger segments do not satisfy a positive trigger ratio), the digital document classification system can analyze/weight category scores equally across all document segments. The digital document classification system can use aggregated category scores for the digital document to respond to search queries or other requests for electronic documents (e.g., to provide digital content targeted to a particular user or client device over a social networking platform).

To illustrate, the digital document classification system can utilize a neural network-based classifier to determine category scores. Moreover, the digital document classification system can apply a threshold category score to identify positive trigger segments of the electronic document. In one or more embodiments, the digital document classification system compares a ratio of positive trigger segments to a threshold positive trigger ratio to dynamically aggregate the output category scores of the neural network-based classifier. For example, if the ratio of positive trigger segments satisfies a threshold positive trigger ratio, the digital document classification system can generate an aggregated category score by focusing on the positive trigger segments. If the ratio of positive trigger segments does not satisfy the threshold positive trigger ratio, the digital document classification system can generate the aggregated category score across the segments of the electronic document more broadly. By dynamically aggregating category scores for the electronic document based on the positive trigger segments and positive trigger ratios, the disclosed systems can accurately and efficiently classify and distribute electronic documents that may be variable in length and/or format. Moreover, the digital document classification system can classify an electronic document with a category using the aggregated category score and surface the electronic document in response to search requests and/or other topic based requests that relate to the category.

As just mentioned, in one or more embodiments, the digital document classification system utilizes a classification model to determine category scores for a plurality of segments from an electronic document. For example, in some embodiments, the digital document classification system divides an electronic document into a plurality of segments (or chunks). Then, the digital document classification system can evaluate the plurality of segments by utilizing a neural network-based classifier to determine one or more category scores for the plurality of segments. In particular, the category scores can indicate the likelihood that segments from the plurality of segments correspond to a target category. In one or more embodiments, the category scores include probability scores that indicate the probability of a segment corresponding to the target category.

Moreover, as mentioned above, the digital document classification system can identify a set of positive trigger segments (e.g., segments that include category scores that satisfy a threshold category score) from the plurality of segments. For instance, the digital document classification system can compare a category score, for a target category, from a segment to a threshold category score to identify whether the segment includes a positive trigger (e.g., a dominant category score). Moreover, when the category score satisfies the threshold category score (e.g., is equal to and/or greater than the threshold category score), the digital document classification system can identify the segment as a positive trigger segment for the target category. In particular, the digital document classification system can determine a set of positive trigger segments by comparing category scores of each segment to the threshold category score.

Furthermore, in some embodiments, the digital document classification system determines a positive trigger ratio (e.g., a proportion of segments that include category scores that meet a threshold category score) based on the set of positive trigger segments and the plurality of segments. For example, upon identifying the positive trigger segments for the target category, the digital document classification system can determine a positive trigger ratio between the identified positive trigger segments and the plurality of segments. Indeed, the digital document classification system can determine the positive trigger ratio based on the number of positive trigger segments relative to the number of segments from the electronic document.

As mentioned above, the digital document classification system can generate an aggregated category score (e.g., a combination of category scores for a category across multiple segments of an electronic document) for the electronic document based on the positive trigger ratio. For example, in one or more embodiments, the digital document classification system generates an aggregated category score for the electronic document based on whether the positive trigger ratio satisfies a threshold positive trigger ratio. For instance, if the determined positive trigger ratio satisfies the threshold positive trigger ratio, the digital document classification system can generate the aggregated category score specifically from category scores corresponding to the set of positive trigger segments. In particular, the digital document classification system can generate the aggregated category score, for the target category, by taking the mean of the category scores corresponding to the positive trigger segments. Otherwise, if the determined positive trigger ratio does not satisfy the threshold positive trigger ratio, the digital document classification system can generate the aggregated category score based on the category scores from all segments of the electronic document.

In one or more embodiments, the digital document classification system provides the electronic document (and/or digital content based on the electronic document) to a client device based on one or more aggregated category scores. For example, in one or more embodiments, the digital document classification system can classify (or associate) an electronic document with one or more categories based on one or more generated aggregated category scores. Moreover, the digital document classification system can utilize classifications of categories for one or more electronic documents to curate and/or distribute digital content (e.g., an electronic document, a digital video corresponding to an electronic document that transcribes the digital video, and/or digital image corresponding to an electronic document that provides a textual description of the digital image) that is relevant to a user of a client device (e.g., in response to a search query from a user or a user request for specific categories and/or topics). For instance, after classifying electronic documents by associating categories with the electronic documents, the digital document classification system can surface electronic documents that include categories that match categories determined from a search request. Moreover, the digital document classification system can also curate and/or distribute the digital content on a social media platform (e.g., a social learning platform) based on the associated categories.

As mentioned above, conventional document distribution systems have a number of shortcomings in relation to accuracy, efficiency, and flexibility of operation. For example, some conventional document distribution systems utilize text classifiers that expect rigid, fixed length documents to determine document classifications. In order to handle variable length documents, some conventional document distribution systems truncate documents and/or utilize neutral embeddings to match the fixed length requirements of a text classifier. However, when large variability in length exists in a corpus of documents, this approach often results in inaccurate document classifications. Accordingly, conventional systems often fail to flexibly and accurately classify variable length documents from different sources.

Some conventional document distribution systems classify documents by calculating a mean score for a category across multiple portions of a document, however such an approach also fails to accurately classify documents as a whole. For instance, conventional document distribution systems tend to produce false negative and/or false positive classifications for a document when evaluating categories of portions of documents. In particular, some conventional document distribution systems tend to produce false negative and/or false positive classifications for a document because of information loss between portions of the document, specific portions of the document skewing the overall category scores within a lengthy document, a lack of strong affirmation to any category between the portions (e.g., indecisive predictions), and/or a depression of category scores due to averaging between the portions.

Moreover, conventional document distribution systems are oftentimes inefficient. For example, some systems seek to address the issues above by utilizing recurrent neural networks. Such systems can handle variable length documents but performance deteriorates with longer documents (e.g., documents greater than 60 words). In addition, RNN based approaches require significant training data and computer resources. Furthermore, as a result of the inaccuracies discussed above, conventional document distribution systems often distribute irrelevant digital content to client devices. Such distribution of irrelevant digital content to client devices often results in additional search requests from the client devices to obtain more relevant digital content (e.g., by modifying the search query, by requesting additional content, etc.). As a result, conventional document distribution systems often utilize additional computational resources in conducting additional digital searches, responding to additional digital queries, and transmitting additional digital content.

The disclosed digital document classification system provides several advantages over conventional systems. For example, the digital document classification system can classify a diverse set of electronic documents with improved accuracy relative to conventional document distribution systems regardless of the length and/or format of electronic documents. For instance, by generating aggregated category scores for an electronic document based on identified positive trigger segments and positive trigger ratios, the digital document classification system results in a greater number of true positive classifications for electronic documents. In particular, the digital document classification system generates amplified aggregated category scores for categories that are dominant across many segments of the electronic document while reducing (e.g., dampening) the number of false positive category classifications for category scores associated with categories that do not satisfy the threshold positive trigger ratio.

Indeed, the digital document classification system produces more true positive classifications compared to many conventional systems and, therefore, more accurately classifies electronic documents with categories that are representative of the topics within the electronic documents. For instance, the digital document classification system reduces the tendency to produce inaccurate classifications due to information loss between segments, a skewing of the overall score because of specific segments within a lengthy document, predictions having weak category affirmation, and/or depression of category scores due to averaging. As a result, the digital document classification system can classify a diverse set of electronic documents with improved accuracy relative to conventional document distribution systems.

In addition to an improvement in accuracy, the digital document classification system can also improve efficiency. For example, relative to RNN-based solutions, the digital document classification system can utilize neural network-based classifiers that utilize less training data and fewer computer resources to train and utilize. In particular, by utilizing category scores that are dominant across a substantial proportion of segments to accurately identify true positive classifications from electronic documents, the digital document classification system can utilize neural network-based classifiers that conventionally are utilized for fixed length documents. Oftentimes, such classifiers utilize less training data and fewer computer resources relative to RNN-based solutions, utilized by many conventional document distribution systems, that require significantly more training data and computer resources to address the issues of classifying variable length documents. Accordingly, the digital document classification system can reliably classify a diverse set of electronic documents with less computational resources relative to some conventional document distribution systems.

Furthermore, the digital document classification system can also improve efficiency by distributing digital content based on aggregated category scores of the electronic documents. For instance, due to more accurately classifying electronic documents with categories that are representative of the topics within the electronic documents, the digital document classification system can provide more relevant digital content to client devices and thus reduce computing resources utilized in distributing irrelevant digital content. For example, the digital document classification system can reduce computer resources devoted to additional searches and/or requests from client devices. In particular, by providing more relevant digital content to client devices because of the improved accuracy in classifying the electronic documents, the digital document classification system can reduce the number of redundant search requests (e.g., repeated search requests with modified search queries).

As illustrated by the foregoing discussion, the present disclosure utilizes a variety of terms to describe features and advantages of the digital document classification system. Additional detail is now provided regarding the meaning of such terms. For example, as used herein, the term "classification model" (sometimes referred to as "classifier") refers to a text classifier that evaluates text to predict one or more categories corresponding to the text. Furthermore, the classification model can include a machine learning model (e.g., a classification machine learning model). For instance, the classification model can include a neural network (e.g., a neural network-based classifier). In particular, the classification model can include a neural network tuned to generate category predictions from text (or electronic documents that include text).

As used herein, the term "neural network" refers to a machine learning model that can be tuned (e.g., trained) based on inputs to approximate unknown functions. In particular, the term "neural network" can include a model of interconnected layers that communicate and analyze attributes at varying degrees of abstraction to learn to approximate complex functions and generate outputs based on a plurality of inputs provided to the model. For instance, the term "neural network" includes one or more machine learning algorithms (or models). In particular, the term "neural network" includes deep convolutional neural networks (e.g., "CNNs"), dense networks, and/or fully convolutional neural networks (e.g., "FCNs"). In other words, a neural network includes an algorithm that implements deep learning techniques, i.e., machine learning that utilizes a set of algorithms to attempt to model high-level abstractions in data.

As used herein, the term "category" (sometimes referred to as "classification" or "topic") refers to a class of documents. In particular, the term "category" refers to a class that indicates the subject (and/or focus) of an electronic document and/or a segment of the electronic document segment. For instance, the category can include a classification that indicates actions, objects, scenes, persons, and/or themes described in an electronic document and/or a segment of the electronic document. For example, a category can include descriptions such as, but not limited to, "business ethics," "medicine," "production and manufacturing," "scientific research and engineering," "sales," "sports," "food," "mountains," and/or "running" to classify the subject of an electronic document and/or a segment of the electronic document.

As used herein, the term "category score" (sometimes referred to as "category likelihood score," "classification score," "classification likelihood score" or "category confidence score") refers to a value that indicates a likelihood for a category. In particular, the term "category score" refers to a value that indicates a likelihood (or probability) of an electronic document and/or a segment of the electronic document corresponding to a category. For instance, the category score can include a numerical value and/or a percentage.

As used herein, the term "aggregated category score" refers to a value that indicates a likelihood for a category based on a plurality of category scores. In particular, the term "aggregated category score" refers to a value that indicates a likelihood of an electronic document corresponding to a category based on a plurality of category scores of an electronic document and/or one or more segments of the electronic document. For instance, the aggregated category score can include a mean value across one or more category scores of one or more positive trigger segments of an electronic document.

As used herein, the term "document" (sometimes referred to as "electronic document") refers to a digital representation of text. In particular, the term "document" refers to an electronic file that includes text. For instance, a document can include a book (e.g., an e-book), website, blog, social media post, a PDF file, and/or other text based files. For example, the term "document" includes a text processing file (e.g., file extensions .doc, .docx, .txt, and/or .wpd), a digital image file that includes text (e.g., file extensions .pdf, .jpg, .tif, and/or .ai), text files for transcriptions of videos, or other digital files (e.g., web files such as .html or .js, spreadsheet files such as .xls, and/or video files that contain text). As used herein, the term "digital content" can include documents, digital videos, digital videos, and/or other representations of digital media.

As used herein, the term "segment" (sometimes referred to as "chunk" or "portion") refers to a region and/or part of an electronic document. In particular, the term "segment" refers to a region and/or part of an electronic document that results from a division of the content of an electronic document. For instance, a segment can include divided parts of an electronic document based on a determined number of words and/or characters (e.g., each segment can include fifty words from the electronic document). Furthermore, a segment can include a sentence from an electronic document (e.g., an electronic document split into segments for every sentence from the electronic document).

As used herein, the term "positive trigger segment" refers to a segment that corresponds to a target category. In particular, a positive trigger segment refers to a segment with a corresponding category score that satisfies a threshold category score for a target category. For example, an electronic document segment that is determined to have a category score of 0.80 for a target category (e.g., sports) can be a positive trigger segment for the target category when the threshold category score is 0.70.

As used herein, the term "positive trigger ratio" (sometimes referred to as "positive trigger proportion") refers to a relation between identified positive trigger segments of an electronic document and other segments of the electronic document. In particular, the term "positive trigger ratio" refers to a quantitative relation between the number of identified positive trigger segments of an electronic document and the number of segments of the electronic document. For example, a positive trigger ratio can include a ratio between the number of positive trigger segments of an electronic document and the total number of segments belonging to the electronic document.

Turning now to the figures, FIG. 1 illustrates a schematic diagram of an environment 100 in which a digital document classification system 106 can operate in accordance with one or more embodiments. As illustrated in FIG. 1, the environment 100 includes server device(s) 102, a network 108, an administrator device 112, and a client device 110. As further illustrated in FIG. 1, the server device(s) 102, the administrator device 112, and the client device 110 can communicate via the network 108.

As shown in FIG. 1, the server device(s) 102 can include a digital document distribution system 104 which further includes the digital document classification system 106. In particular, the digital document classification system 106 can utilize a classification model (e.g., a neural network-based classifier) to analyze a plurality of segments from an electronic document to determine category scores for the segments. Additionally, the digital document classification system 106 can determine positive trigger segments and/or positive trigger ratios from the plurality of segments that include the category scores. Furthermore, the digital document classification system 106 can generate one or more aggregated category scores for the electronic document based on the determined positive trigger segments and/or positive trigger ratios. Moreover, the digital document classification system 106 can classify the electronic document based on the aggregated category scores and/or provide the electronic document (or digital content) to the client device 110 (or the administrator device 112) based on the generated aggregated category scores. Indeed, the digital document classification system 106 can determine positive trigger segments and/or positive trigger ratios, generate aggregated category scores based on the positive trigger segments and/or positive trigger ratios, and/or provide electronic documents to client devices.

Furthermore, the server device(s) 102 can store data for the digital document classification system 106. For instance, the server device(s) 102 can store data such as electronic documents and/or digital content associated with electronic documents. Moreover, the server device(s) 102 can store category score information and/or aggregated category score information generated by the digital document classification system 106 for the electronic documents. Additionally, the server device(s) 102 can store components and/or data for one or more classification models. The server device(s) 102 can include a variety of computing devices, including those explained below with reference to FIG. 8.

In addition, as mentioned above and as shown in FIG. 1, the environment 100 includes the client device 110. The client device 110 can include, but is not limited to, a mobile device (e.g., smartphone or tablet), a laptop, a desktop, including those explained below with reference to FIG. 8. Furthermore, although not shown in FIG. 1, the client device 110 can be operated by a user to perform a variety of functions. In particular, the client device 110 can perform functions such as, but not limited to, creating, storing, uploading, and/or modifying a variety of digital content (e.g., electronic documents, digital videos, and/or digital images). For example, the client device 110 can communicate with the server device(s) 102 via the network 108 to provide and/or receive digital content to and/or from the server device(s) 102. Additionally, the client device 110 can request electronic documents (or digital content corresponding to the electronic documents), interact with digital content, and/or conduct search queries for digital content which include category classifications on the server device(s) 102 and/or the network 108. Although FIG. 1 illustrates the environment 100 with a single client device 110, the environment 100 can include any number of client devices.

Moreover, as shown in FIG. 1, the environment 100 includes the administrator device 112. The administrator device 112 can include, but is not limited to, a mobile device (e.g., smartphone or tablet), a laptop, a desktop, including those explained below with reference to FIG. 8. Although FIG. 1 illustrates the environment 100 with a single administrator device 112, the environment 100 can include any number of client devices.

Furthermore, the administrator device 112 can be operated by an administrator to perform a variety of functions. In particular, the administrator device 112 can perform functions such as, but not limited to, configuring (or selecting) one or more threshold category scores, one or more threshold positive trigger ratios, and/or one or more threshold classification scores. Additionally, the administrator device 112 can create, store, upload, and/or modify a variety of digital content (e.g., electronic documents, digital videos, and/or digital images). In addition, the administrator device 112 can also perform functions such as distributing one or more electronic documents (or digital content corresponding to the electronic documents) to client devices (e.g., in response to a search query, on a social media platform, and/or on an advertisement campaign). Moreover, the administrator device 112 can utilize one or more classified electronic documents (based on aggregated category scores) as training data to train one or more classification models.

Additionally, as shown in FIG. 1, the environment 100 includes the network 108. The network 108 can enable communication between components of the environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 102, the client device 110, and the network 108 may communicate using any communication platforms and technologies suitable for transporting data and/or communication signals, including any known communication technologies, devices, media, and protocols supportive of data communications, examples of which are described with reference to FIG. 8.

Although FIG. 1 illustrates the server device(s) 102, the client device 110, and the administrator device 112 communicating via the network 108, the various components of the environment 100 can communicate and/or interact via other methods (e.g., the server device(s) 102 and the client device 110 can communicate directly). Furthermore, although FIG. 1 illustrates the digital document classification system 106 being implemented by a particular component and/or device within the environment 100, the digital document classification system 106 can be implemented, in whole or in part, by other computing devices and/or components in the environment 100 (e.g., the client device 110 and/or the administrator device 112).

Figure 2:
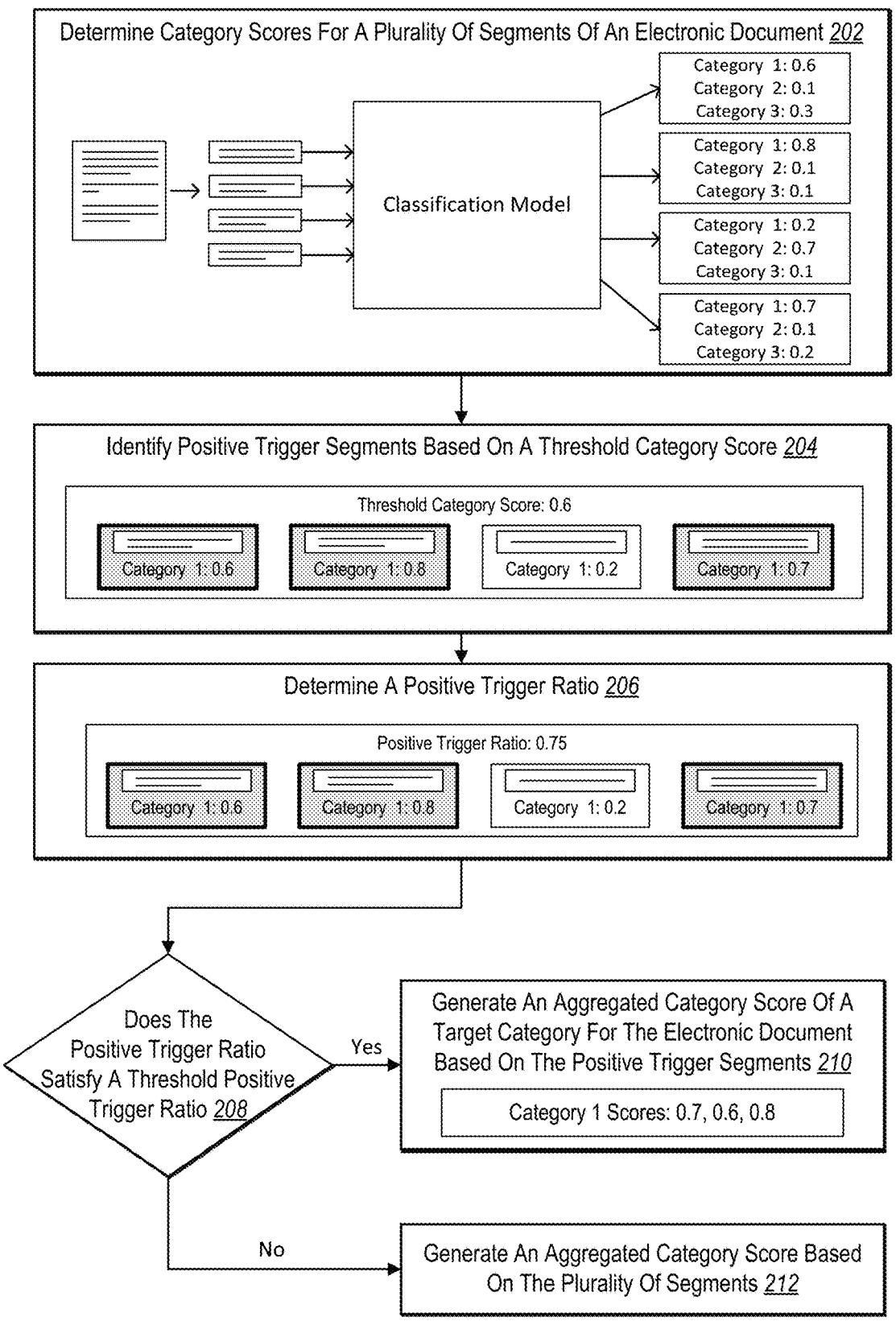
FIG. 2 illustrates a flowchart of a digital document classification system generating an aggregated category score based on positive trigger segments and positive trigger ratios in accordance with one or more embodiments.

As mentioned above, the digital document classification system 106 can generate an aggregated category score for an electronic document from identified positive trigger segments of a plurality of segments that satisfy a positive trigger ratio. For example, FIG. 2 illustrates a flowchart of the digital document classification system 106 generating an aggregated category score for an electronic document based on identified positive trigger segments and positive trigger ratios in accordance with one or more embodiments. As mentioned above, the digital document classification system 106 can calculate an aggregated category score for a category across identified positive trigger segments when a determined ratio of the positive trigger segments satisfies a threshold positive trigger ratio. Otherwise, the digital document classification system 106 can calculate the aggregated category score for the category across the total segments of the electronic document.

For example, as shown in FIG. 2, the digital document classification system 106 performs an act 202 of determining category scores for a plurality of segments of an electronic document. In particular, the digital document classification system 106 can separate an electronic document into a plurality of segments. The digital document classification system 106 can then utilize a classification model to determine category scores for the segments that indicate likelihoods that the segments correspond to a target (or specific category). For example, as illustrated in FIG. 2, the digital document classification system 106 determines category scores for category 1, category 2, and category 3 for each segment of an electronic document by utilizing a classification model. The digital document classification system 106 identifies segments and determines category scores for the segments by utilizing a classification model as described in greater detail below.

In addition, as shown in FIG. 2, the digital document classification system 106 performs an act 204 of identifying positive trigger segments based on a threshold category score (for a target category). In particular, as mentioned above, the digital document classification system 106 can identify positive trigger segments for a category by comparing category scores (corresponding to the target category) to a threshold category score. Indeed, if a category score satisfies the threshold category score, the digital document classification system 106 can identify the segment that includes the category score as a positive trigger segment.

In one or more embodiments, the digital document classification system 106 determines a threshold category score. For example, in some embodiments the digital document classification system 106 utilizes a threshold category score selected by an administrator (e.g., via the administrator device 112). In other embodiments, the digital document classification system 106 can utilize pre-defined threshold category scores. For instance, the threshold category score can include values such as, but not limited to, 0.5, 0.6, 0.8, and/or 0.9.

In some embodiments, the digital document classification system 106 can determine (or configure) the threshold category score based on characteristics of one or more electronic documents (e.g., electronic documents that are being classified by the digital document classification system 106). In particular, the digital document classification system 106 can include various pre-determined threshold category scores that correspond to different characteristics of the electronic documents. For instance, the digital document classification system 106 can set and/or configure the threshold category score based on characteristics such as, but not limited to, the length of one or more electronic documents, the type of one or more electronic documents, and/or the language corresponding to the one or more electronic documents. The digital document classification system 106 can configure the threshold category score in either direction (i.e., increase and/or decrease the value) based on any of or any combination of one or more characteristics of one or more electronic documents.

Furthermore, the digital document classification system 106 can determine if a category score satisfies a threshold category score by comparing the category score to the threshold category score. For instance, the digital document classification system 106 can determine that a category score satisfies a threshold category score if the category score is greater than the threshold category score. Moreover, in some embodiments, the digital document classification system 106 determines that a category score satisfies a threshold category score if the category score is greater than or equal to the threshold category score.

Upon determining that a category score for a target category (corresponding to a segment) satisfies a threshold category score, the digital document classification system 106 can identify that the segment is a positive trigger segment for the target category. For instance, the digital document classification system 106 can flag, assign, and/or label the segment that includes the category score that satisfies the threshold category score as a positive trigger segment for the target category. In some embodiments, the digital document classification system 106 adds the segment to a list of positive trigger segments for the target category. In particular, the digital document classification system 106 can compare category scores (for a target category) of each segment to the threshold category score to identify one or more positive trigger segments. As illustrated in FIG. 2, the digital document classification system 106 identifies segments that include a category score 1 that is greater than or equal to a threshold category score of 0.6. In response the digital document classification system 106 identifies these segments as positive trigger segments (e.g., the shaded segments) for the target category (i.e., "category 1").

Furthermore, as mentioned above, the digital document classification system 106 can determine a positive trigger ratio based on positive trigger segments for a target category. For example, as shown in FIG. 2, the digital document classification system 106 performs an act 206 of determining a positive trigger ratio. Specifically, the digital document classification system 106 determines the positive trigger ratio based on the positive trigger segments (of a target category) and the plurality of segments corresponding to an electronic document.

For instance, the digital document classification system 106 can determine the positive trigger ratio by identifying a proportion, percentage, and/or fraction between identified positive trigger segments and the total number of segments corresponding to the electronic document (e.g., the number of positive trigger segments for a target category divided by the total number of segments for the electronic document). As illustrated in FIG. 2, the digital document classification system 106 determines a positive trigger ratio of 0.75 for category 1 because the digital document classification system 106 identifies three positive trigger segments for category 1 (e.g., the highlighted segments) out of the four available segments of the electronic document (e.g., three positive trigger segments out of four total segments).

Upon determining a positive trigger ratio for positive trigger segments for a target category, the digital document classification system 106 can determine if the positive trigger ratio satisfies a threshold positive trigger ratio. In particular, the digital document classification system 106 can use this determination in order to determine whether to generate an aggregated category score for the target category based on positive trigger segments or based on all of segments from an electronic document for the target category. For example, as shown in FIG. 2, the digital document classification system 106 performs an act 208 of determining if a positive trigger ratio satisfies a threshold positive trigger ratio.

In one or more embodiments, the digital document classification system 106 can determine a threshold positive trigger ratio similarly to determining a threshold category score (as described above). In particular, the digital document classification system 106 can include a threshold positive trigger ratio that is selected by an administrator (e.g., via the administrator device 112). Furthermore, in some embodiments, the digital document classification system 106 set and/or configure the threshold positive trigger ratio based on pre-determined threshold positive trigger ratios that correspond to different characteristics of one or more electronic documents that are being classified by the digital document classification system 106. For instance, the threshold positive trigger ratio can include a value such as, but not limited to, 0.4, 0.5, and/or 0.65.

Additionally, the digital document classification system 106 can determine if a positive trigger ratio (for a target category) satisfies a threshold positive trigger ratio by comparing the positive trigger ratio to the threshold positive trigger ratio. For example, the digital document classification system 106 can determine that a positive trigger ratio satisfies a threshold positive trigger ratio if the positive trigger ratio is greater than the threshold positive trigger ratio. Moreover, in some embodiments, the digital document classification system 106 determines that a positive trigger ratio satisfies a threshold positive trigger ratio if the category score is greater than or equal to the threshold category score.

When a positive trigger ratio (corresponding to a target category) satisfies a threshold positive ratio, the digital document classification system 106 can generate an aggregated category score for the target category based on category scores from positive trigger segments of the target category. For instance, as shown in FIG. 2, the digital document classification system 106 performs an act 210 of generating an aggregated category score of a target category for an electronic document based on positive trigger segments. In particular, the digital document classification system 106 can utilize category scores corresponding to a target category from identified positive trigger segments to generate the aggregated category score for the target category.

As an example and as shown in FIG. 2, the digital document classification system 106 determines that the positive trigger ratio determined for category 1 (e.g., in the act 206) satisfies a threshold positive trigger ratio (e.g., a positive trigger ration of 0.75 satisfies a threshold positive trigger ratio of 0.4). As a result, as illustrated in FIG. 2, the digital document classification system 106 utilizes category scores 0.7, 0.6, and 0.8 for category 1 from the identified positive trigger segments (e.g., the highlighted segments in act 204) to generate the aggregated category score in the act 210. By only utilizing the category scores corresponding to the positive trigger segments of a target category to generate the aggregated category score (when a positive trigger ratio satisfies a threshold positive trigger ratio) the digital document classification system 106 amplifies (or boosts) the aggregation score for the target category.

Furthermore, the digital document classification system 106 can aggregate one or more category scores corresponding to positive trigger segments for a target category utilizing a variety of aggregation methods. For instance, the digital document classification system 106 can calculate the mean of the one or more category scores corresponding to the positive trigger segments to generate the aggregated category score for a target category. Additionally, in one or more embodiments, the digital document classification system 106 calculates a median, mode, and/or max from one or more category scores corresponding to positive trigger segments to generate an aggregated category score for a target category. Although one or more embodiments herein describe the digital document classification system 106 utilizing a mean (e.g., an average) of the one or more category scores corresponding to positive trigger segments to generate the aggregated category score for a target category, the digital document classification system 106 can utilize a variety of statistical analyses and/or algorithms to aggregate the one or more category scores corresponding to the positive trigger segments.

When a positive trigger ratio (corresponding to a target category) does not satisfy a threshold positive ratio, the digital document classification system 106 can generate an aggregated category score for the target category based on category scores across additional segments of the electronic document. For instance, as shown in FIG. 2, the digital document classification system 106 performs an act 212 of generating an aggregated category score of a target category for an electronic document based on a plurality of segments (when the positive trigger ratio does not satisfy a threshold positive trigger ratio). In particular, the digital document classification system 106 can utilize category scores from all segments of an electronic document to generate the aggregated category score for the target category. For instance, the digital document classification system 106 can generate an aggregated category score based on the plurality of segments utilizing one or more aggregation calculations in accordance with one or more embodiments above.

Additionally, one or more steps performed by the digital document classification system 106 in FIG. 2 (and below) can be described as a computer-implemented algorithm. For example, the digital document classification system 106 can utilize the following algorithm to generate an aggregated category score for an electronic document from identified positive trigger segments of a plurality of segments that satisfy a positive trigger ratio. For instance, let $agg^c$ be the aggregated category score for a category c. Then:

$$agg^c = \begin{cases} \dfrac{\sum_{i=0}^{N} \mathbb{1}[S_i^c \geq S_{thresh}] * S_i^c}{\sum_{i=0}^{N} \mathbb{1}[S_i^C \geq S_{thresh}]}, & \text{if } \dfrac{\sum_{i=0}^{N} \mathbb{1}[S_i^c \geq S_{thresh}]}{N} \geq P_{thresh} \\ \\ \dfrac{\sum_{i=0}^{N} S_i^c}{N}, & \text{otherwise} \end{cases}$$

For example, in reference to the above algorithm, the digital document classification system 106 divides (or breaks down) an electronic document into N segments. The digital document classification system 106 determines C categories into which the electronic document (and/or segments $d_i$) are classified. Furthermore, in the above algorithm, $S_i^c$ is the likelihood score (e.g., the category score) for a segment i and category c as determined by a classification model. Additionally, $S_{thresh}$ is the threshold category score for identifying if a category score in a segment is triggered as a positive trigger segment. Moreover, $P_{thresh}$ is the positive trigger ratio threshold. In one or more embodiments, the digital document classification system 106 sets $P_{thresh}$ as a hyperparameter.

As mentioned above, the digital document classification system 106 can utilize the above algorithm to generate an aggregated category score (e.g., $agg^c$) for a category c. In particular, in the above algorithm, the digital document classification system 106 can generate an aggregated score by only selecting the category scores of those segments that are positive trigger segments for a category (e.g., the category scores of a segment that satisfy the threshold category score $S_{thresh}$), when a positive trigger ratio of the category satisfies the positive trigger ratio threshold (e.g., $P_{thresh}$). Otherwise, the digital document classification system 106 can generate an aggregated score by utilizing category scores of all N segments.

Although FIG. 2 illustrates one scenario for a set of category scores (e.g., for category 1), the digital document classification system 106 can generate aggregated category scores for a variety of categories based on a variety of identified positive trigger segments, a lack of positive trigger segments, and/or a variety of positive trigger ratios. For example, when a target category has zero identified positive trigger segments, the digital document classification system 106 can utilize category scores corresponding to a target category from all segments of an electronic document to generate the aggregated category score for the target category. The figures below (e.g., FIGS. 3A-3C) describe the digital document classification system 106 generating aggregated category scores based on variations of identified positive trigger segments, a lack of positive trigger segments, and/or a variety of positive trigger ratios.

Additionally, although FIG. 2 illustrates generating an aggregated category score for a single target category, the digital document classification system 106 can perform the one or more steps described herein to identify positive trigger segments and/or positive trigger ratios for any number of target categories. Moreover, the digital document classification system 106 can perform the one or more steps described herein to generate aggregated category scores for any number of categories for an electronic document. Furthermore, the digital document classification system 106 can perform the one or more steps described herein to generate aggregated category scores for any number of electronic documents.

Figure 3A:
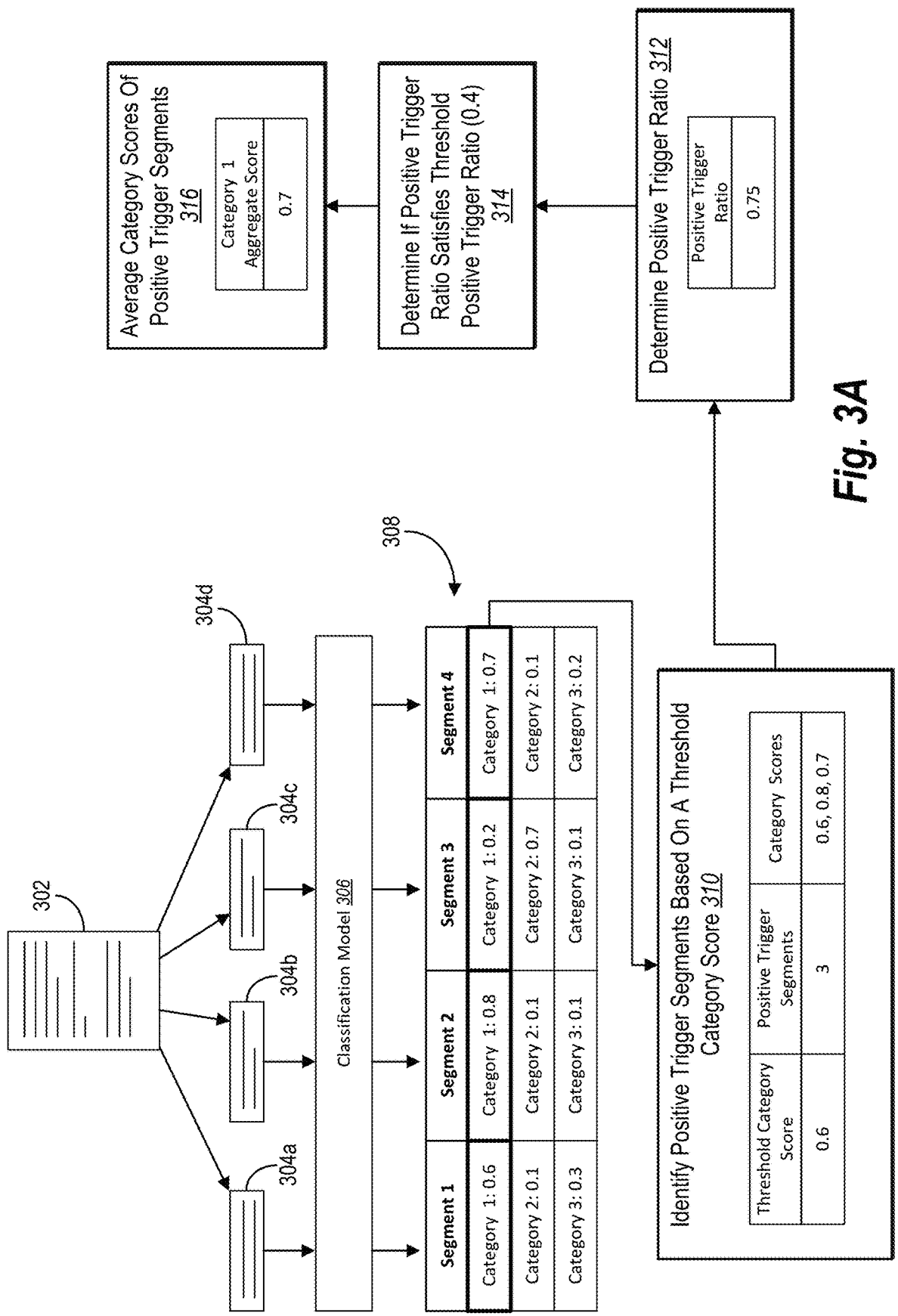
FIG. 3A illustrates generating an aggregated category score based on positive trigger segments in accordance with one or more embodiments.
Figure 3B:
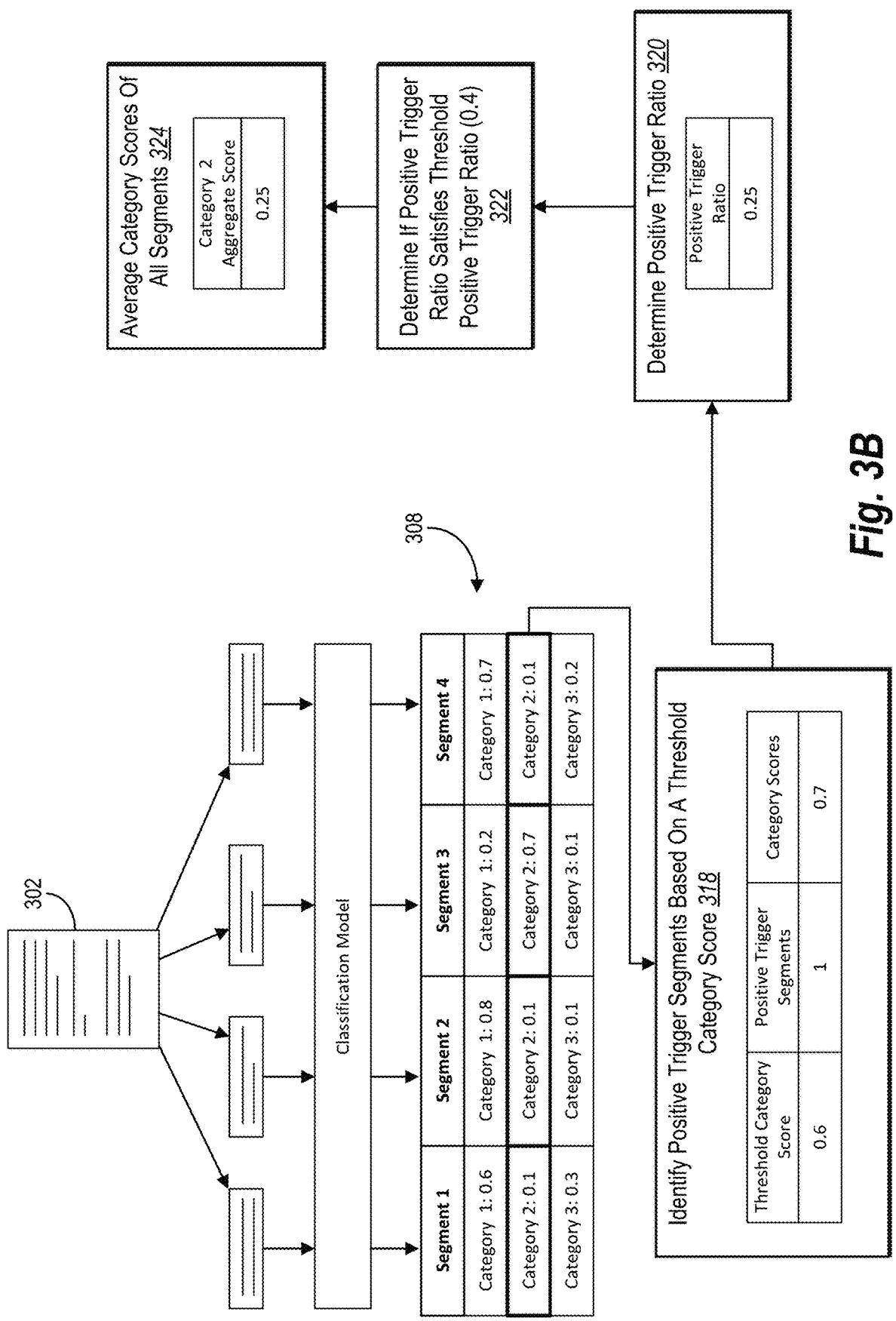
FIG. 3B illustrates generating an aggregated category score in accordance with one or more embodiments.
Figure 3C:
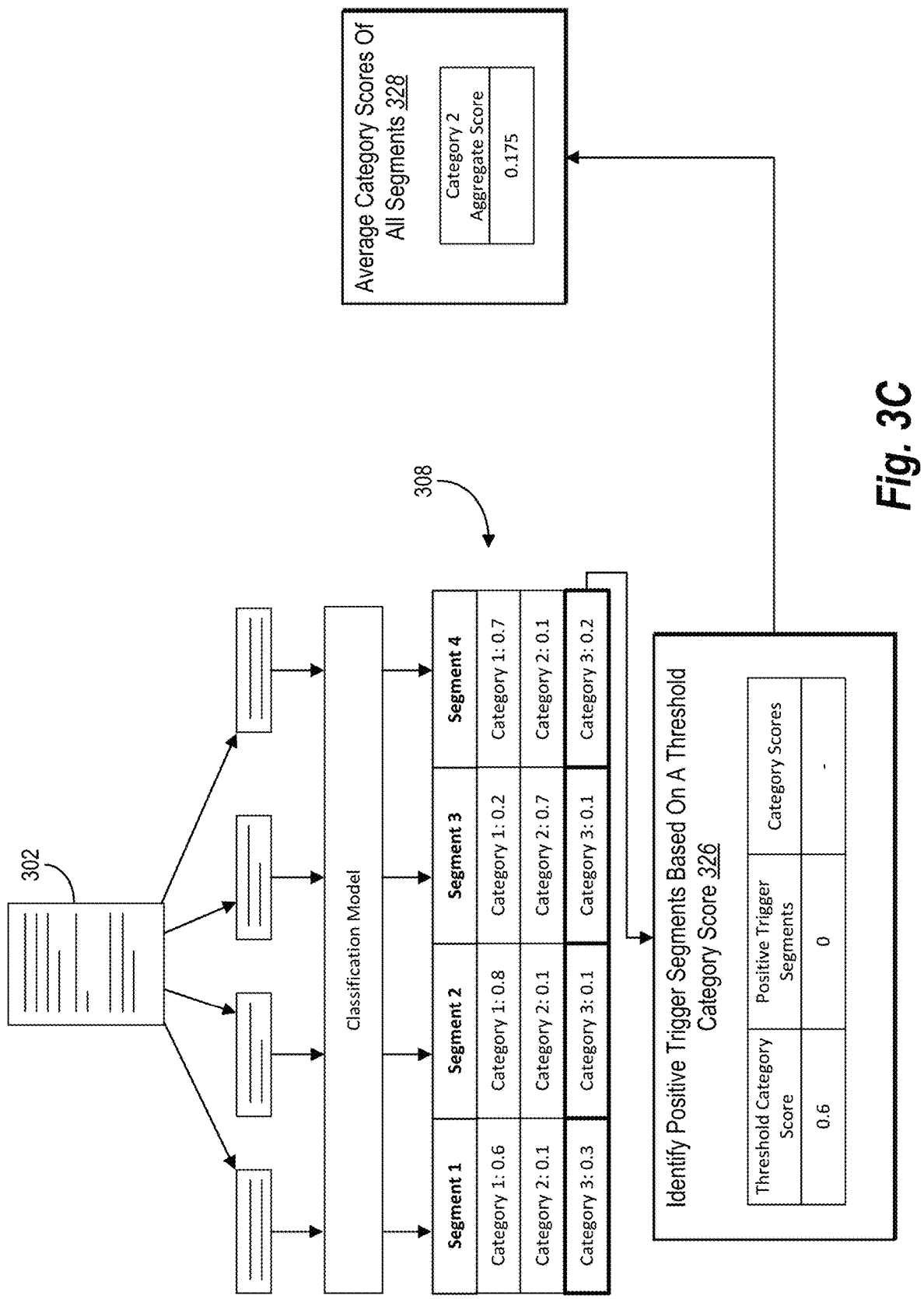
FIG. 3C illustrates generating an aggregated category score in accordance with one or more embodiments.

As mentioned above, the digital document classification system 106 can generate an aggregated category score for any number (or variety) of categories of an electronic document based on positive trigger segments and/or positive trigger ratios. As an example, FIGS. 3A-3C illustrate the digital document classification system 106 generating aggregated category scores for various categories for an electronic document utilizing identified positive segments and/or positive trigger ratios in accordance with one or more embodiments. For instance, as illustrated in FIG. 3A, the digital document classification system 106 generates an aggregated category score, for an electronic document, utilizing positive trigger segments of a category that satisfy a threshold positive trigger ratio.

As shown in FIG. 3A, the digital document classification system 106 receives an electronic document 302. As mentioned above, the electronic document 302 can include an electronic document of any length and/or format. For instance, the electronic document 302 can be, but is not limited to, an e-book, a video transcription, a blog post, a web article, a PDF file, and/or a text document created in a word processor. Although, FIGS. 3A-3C illustrate an example of the digital document classification system 106 generating aggregated category scores for a single electronic document, the digital document classification system 106 can generate aggregated category scores for a variety of electronic documents in a variety of lengths and/or formats.

Upon receiving an electronic document, the digital document classification system 106 can divide the electronic document into a plurality of segments. For instance, as shown in FIG. 3A, the digital document classification system 106 divides the electronic document 302 into a plurality of segments 304a, 304b, 304c, and 304d. Specifically, the digital document classification system 106 divides the electronic document 302 into segments of equal length. The digital document classification system 106 can determine a segment size (e.g., based on user selection and/or based on a number of words and/or characters of electronic documents). In some embodiments, the digital document classification system 106 divides an electronic document into a plurality of segments by dividing the electronic document sentence-wise (e.g., each segment includes a sentence from the electronic document).

As shown in FIG. 3A, upon dividing the electronic document 302 into a plurality of segments 304a, 304b, 304c, and 304d, the digital document classification system 106 utilizes a classification model 306 to determine category scores for the plurality of segments 304a, 304b, 304c, and 304d. The classification model 306 can include a variety of text classifiers. For example, the classification model can include a neural network-based classifier (e.g., TextCNN or FastText). In particular, the classification model can be trained to evaluate (and/or analyze) input text (with or without neutral padding) to determine a prediction as to the likelihood of the text corresponding to one or more categories (e.g., category scores).

The digital document classification system 106 can train the classification model 306. For example, the digital document classification system 106 can input a training segment of an electronic document into a classification model. Then, the classification model can analyze text of the training segment to predict a category score for one or more categories. The digital document classification system 106 can compare (e.g., utilizing a loss function) the predicted category score to a ground truth classification (e.g., a known classification for the training segment). Based on the comparison, the digital document classification system 106 can modify internal parameters of the classification model 306. By iteratively generating predicted categories and comparing the predicted categories to ground truth classifications, the digital document classification system 106 can train the classification model 306. The digital document classification system 106 can train the classification model 306 to determine a category score for any number of categories.

As illustrated in FIG. 3A, the digital document classification system 106 can utilize the classification model 306 to analyze the text segments 304a-304d. In particular, the digital document classification system 106 can input segments 304a-304d into a classification model 306 and generate category scores (as shown in the category scores table 308). Specifically, the category scores table 308 illustrates the classification model 306 generating category scores for category 1, category 2, and category 3 for each segment (e.g., a score between 0 and 1 that indicate likelihoods of the segment corresponding to the specific categories).

Additionally, as shown in FIG. 3A, the digital document classification system 106 generates an aggregated category score for category 1 for the electronic document 302. For example, (in an act 310) the digital document classification system 106 utilizes the category scores for category 1 for each segment to identify positive trigger segments based on a threshold category score. In particular, as shown in FIG. 3A, the digital document classification system 106 compares the category scores for category 1 from each segment to determine if the category scores satisfy a threshold category score (e.g., a threshold category score of 0.6). Indeed, as shown in FIG. 3A, the digital document classification system 106 identifies three positive trigger segments for category 1 (e.g., the segments that include a category score of 0.6, 0.8, and 0.7 for category 1).

In addition, as shown in FIG. 3A, (in an act 312) the digital document classification system 106 determines a positive trigger ratio for category 1. For instance, as shown in FIG. 3A, the digital document classification system 106 determines a positive trigger ratio (a positive trigger ratio of 0.75) for category 1 based on the identified three positive trigger segments for category 1 (e.g., three identified positive trigger segments divided by the four identified segments 303a-304d).

Moreover, as shown in FIG. 3A, (in an act 314) the digital document classification system 106 determines if the determined positive trigger ratio for category 1 (e.g., a positive trigger ratio of 0.75) satisfies a threshold positive trigger ratio (e.g., a threshold positive trigger ratio of 0.4). For instance, as shown in FIG. 3A, the digital document classification system 106 determines that the positive trigger ratio of category 1 satisfies the threshold positive trigger ratio because the positive trigger ratio of category 1 is greater than the threshold positive trigger ratio.

As shown in FIG. 3A, because the positive trigger ratio of category 1 satisfies the threshold positive trigger ratio, the digital document classification system 106 (in an act 316) generates an aggregated category score for category 1 based on the positive trigger segments of category 1. In particular, as shown in FIG. 3A, the digital document classification system 106 calculate an average from the positive trigger segments for category 1 (e.g., category scores 0.6, 0.8, and 0.7) to generate an aggregated category score 1 (e.g., category 1 aggregate score of 0.7). Furthermore, the digital document classification system 106 can associate the aggregated category score for category 1 with the electronic document 302 and/or classify the electronic document 302 based on the aggregated category score for category 1 (as described in greater detail below).

As mentioned above, when a positive trigger ratio fails to satisfy a threshold positive trigger ratio, the digital document classification system 106 can generate an aggregated category score utilizing a broader set of segments. For example, as shown in FIG. 3B, the digital document classification system 106 generates an aggregated category score from category scores for category 2 for the electronic document 302 (from category scores table 308). As shown in FIG. 3B, (in an act 318) the digital document classification system 106 identifies positive trigger segments based on the threshold category score for category 2 (e.g., the threshold category score of 0.6). As further illustrated in FIG. 3B, the digital document classification system 106 identifies one positive trigger segment for category 2 (e.g., the segment which includes a category 2 score of 0.7).

As shown in FIG. 3B (in an act 320), the digital document classification system 106 determines a positive trigger ratio for the identified positive trigger segment for category 2. Specifically, the digital document classification system 106 determines a positive trigger ratio of 0.25 based on one identified positive trigger segment from the four segments of the electronic document 302.

Furthermore, (in an act 322) the digital document classification system 106 determines if the determined positive trigger ratio for category 2 (e.g., a positive trigger ratio of 0.25) satisfies a threshold positive trigger ratio (e.g., a threshold positive trigger ratio of 0.4). In particular, referring to FIG. 3B, the digital document classification system 106 determines that the positive trigger ratio for category 2 does not satisfy the threshold positive trigger ratio.

As further shown in FIG. 3B, upon determining that the positive trigger ratio for category 2 does not satisfy the threshold positive trigger ratio the digital document classification system 106 (in an act 324) averages category scores of all of the segments for category 2. In particular, as shown in FIG. 3B, the digital document classification system 106 calculates an average of the category scores of category 2 from all of the segments for category 2 (e.g., category scores 0.1, 0.1, 0.7, and 0.1) to generate an aggregated category score for category 2 (e.g., category 2 aggregate score of 0.25). Moreover, the digital document classification system 106 can associate the aggregated category score for category 2 with the electronic document 302.

As mentioned above, the digital document classification system 106 can also generate an aggregated category score when no positive trigger segments are identified. For instance, as shown in FIG. 3C, the digital document classification system 106 generates an aggregated category score from category scores for category 3 for the electronic document 302 (from category scores table 308). As shown in FIG. 3C, (in an act 326) the digital document classification system 106 identifies positive trigger segments based on the threshold category score for category 3 (e.g., the threshold category score of 0.6). As further illustrated in FIG. 3C, the digital document classification system 106 does not identify any positive trigger segments for category 3.

In response to identifying no positive trigger segments, (in an act 328) the digital document classification system 106 averages category scores for all of the segments for category 3. In particular, as shown in FIG. 3C, the digital document classification system 106 calculates an average of the category scores of category 3 from all of the segments for category 3 (e.g., category scores 0.3, 0.1, 0.1, and 0.2) to generate an aggregated category score for category 3 (e.g., category 3 aggregate score of 0.175). Moreover, the digital document classification system 106 can associate the aggregated category score for category 3 with the electronic document 302.

As mentioned above, the digital document classification system 106 can classify and/or provide electronic documents (and/or digital content based on the electronic document) based on one or more aggregated category scores of the electronic document. For instance, the digital document classification system 106 can classify an electronic document with one or more specific categories based on a threshold classification score. In particular, the digital document classification system 106 can compare an aggregated category score (of a target category) determined for an electronic document with a threshold classification score to determine whether the electronic document should be classified with the target category. For example, the digital document classification system 106 can classify an electronic document with a target category when an aggregated category score (of the target category) satisfies the threshold classification score. Indeed, the digital document classification system 106 can distribute one or more electronic documents based on such classifications. Furthermore, the digital document classification system 106 can also classify digital content that is associated with a classified electronic document (e.g., a digital video associated with a transcription that includes aggregated category scores).

For example, upon classifying (or associating) one or more categories with electronic documents, the digital document classification system 106 can include the electronic documents and other digital content such as digital videos (that correspond to an electronic document) into a repository of digital content. Indeed, the repository of digital content can include the electronic documents (e.g., web pages, files, text documents, etc.), digital videos that correspond to electronic documents (e.g., transcripts, text descriptions, and/or metadata), and/or digital images that correspond to electronic documents (e.g., text descriptions and/or metadata) with reference to their associated category (e.g., as labels and/or tags for the digital content).

Furthermore, the digital document classification system 106 can provide such digital content in response to a search request and/or other request. For instance, the digital document classification system 106 can determine one or more categories represented by a search query and match the determined one or more categories to categories in the repository of digital content. Moreover, the digital document classification system 106 can identify digital content from the repository of digital content that include the matched categories. Additionally, the digital document classification system 106 can also receive a request for a category (e.g., by clicking on a topic and/or link that corresponds to a category) and match the requested category to categories in the repository of digital content to surface digital content that includes the requested categories.

In addition, the digital document classification system 106 can also provide an electronic document to a client device based on one or more aggregated category scores associated with the electronic document. For instance, the digital document classification system 106 can compare the one or more aggregated category scores to a threshold classification score to determine whether the electronic document should be provided to a client device. In particular, the digital document classification system 106 can identify and provide one or more electronic documents to a client that have aggregated category scores for a target category (e.g., a target category based on a user request and/or search query) that satisfy a threshold classification score.

Figure 4:
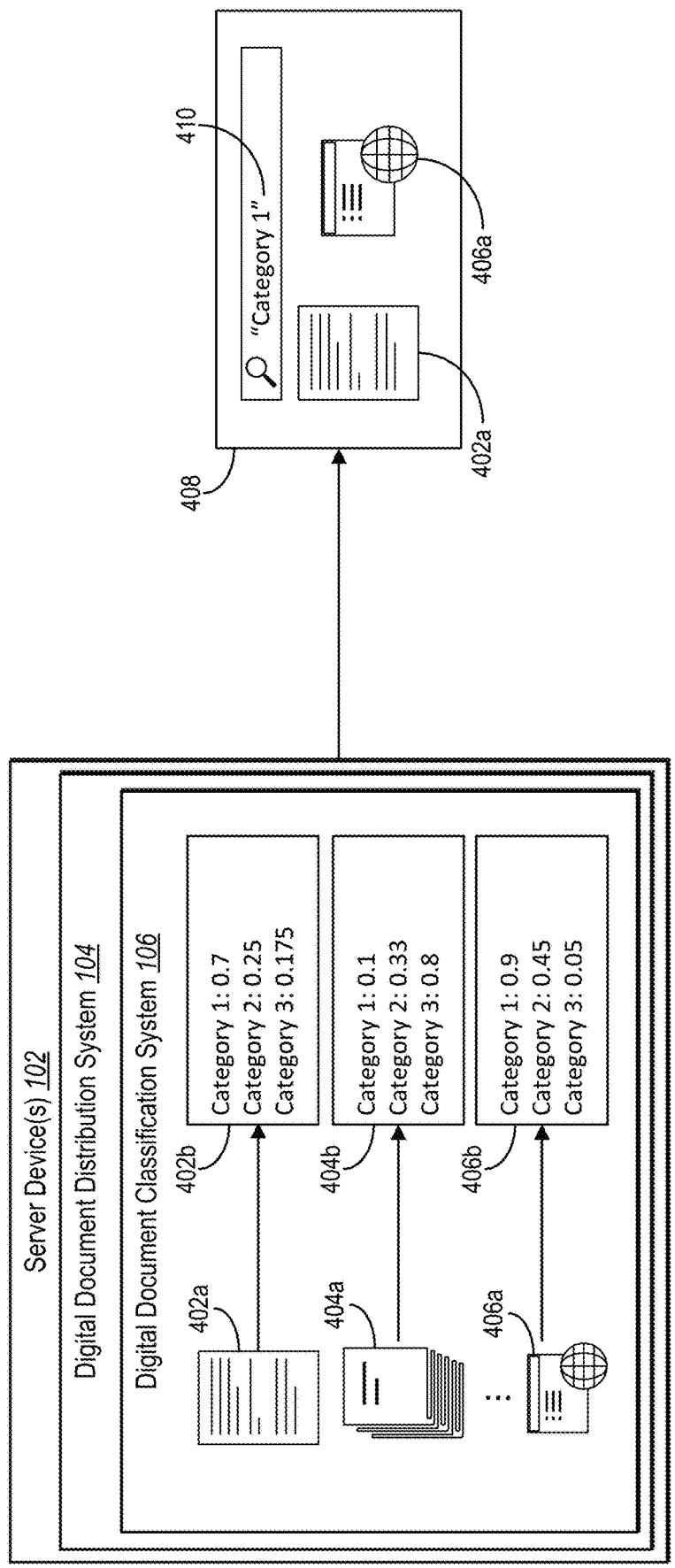
FIG. 4 illustrates a digital document classification system determining categories for electronic documents in accordance with one or more embodiments.

For example, FIG. 4 illustrates the digital document classification system 106 providing one or more electronic documents to a client device based on one or more aggregated category scores in accordance with one or more embodiments. As illustrated in FIG. 4, the digital document classification system 106 associates category scores 402b with an electronic document 402a, category scores 404b with an electronic document 404a, and category scores 406b with an electronic document 406a (determined in accordance with one or more embodiments herein). Then, as shown in FIG. 4, the digital document classification system 106 provides the electronic document 402a and the electronic document 406a within a user interface 408 on a client device in response to a search query 410 (e.g., a search for "Category 1"). For instance, in reference to FIG. 4, the digital document classification system 106 identifies electronic documents that have a category score for category 1 that satisfies a threshold classification score (e.g., a threshold classification score of 0.6). In particular, as shown in FIG. 4, the digital document classification system 106 provides the electronic document 402a (associated with a category 1 score of 0.7) and the electronic document 406a (associated with a category 1 score of 0.9).

Moreover, upon classifying an electronic document and/or associating aggregated category scores to the electronic document, the digital document classification system 106 can utilize the classified electronic document in a variety of other implementations. For instance, the digital document classification system 106 can categorize and provide one or more classified electronic documents on a social media platform. Additionally, the digital document classification system 106 can utilize one or more aggregated category scores for an electronic document to store and organize electronic documents within electronic document repositories (e.g., at a server that manages digital content for one or more client devices). Moreover, the digital document classification system 106 can utilize the generated aggregated category scores for one or more electronic documents to label the electronic documents, as training data, to further train a classification model.

For example, the digital document classification system 106 can provide one or more electronic documents on a social learning platform (or another social media platform). In particular, the digital document classification system 106 can provide an electronic document on a specific section (e.g., associated with a category) and/or to a user of the social learning platform based on the classification (or aggregated category scores) of the electronic document. Furthermore, the electronic document can be provided to a user of the social learning platform based on a comparison between characteristics of the user and the classification (or aggregated category scores) of the electronic document. Moreover, the digital document classification system 106 can provide an electronic document on a social learning platform based on whether one or more aggregated category scores of the electronic document satisfies a threshold relevance score associated with the social learning platform.

Furthermore, the digital document classification system 106 can utilize one or more aggregated category scores in managing a repository of electronic documents. For instance, the digital document classification system 106 can generate aggregated category scores to classify and incorporate electronic documents within a collection of electronic documents that correspond to a specific category. In particular, the digital document classification system 106 can receive an electronic document from a client device. Then, the digital document classification system 106 can generate aggregated category scores for the electronic document in accordance with one or more embodiments herein. Additionally, the digital document classification system 106 can determine whether the electronic document belongs within one or more collections of electronic documents based on the aggregated category scores (or a determined classification).

Additionally, the digital document classification system 106 can utilize one or more aggregated category scores of an electronic document to label the electronic document, as training data, to further train a classification model. For instance, the digital document classification system 106 can determine one or more aggregated category scores for one or more electronic documents and/or classify the one or more documents in accordance with one or more embodiments described herein. Furthermore, the digital document classification system 106 can utilize such aggregated category scores and/or classifications (e.g., as ground truth information) to label the one or more electronic documents. Then, the digital document classification system 106 can utilize the labeled one or more electronic documents as training data (e.g., auto labeling) for a classification model.

Figure 5:
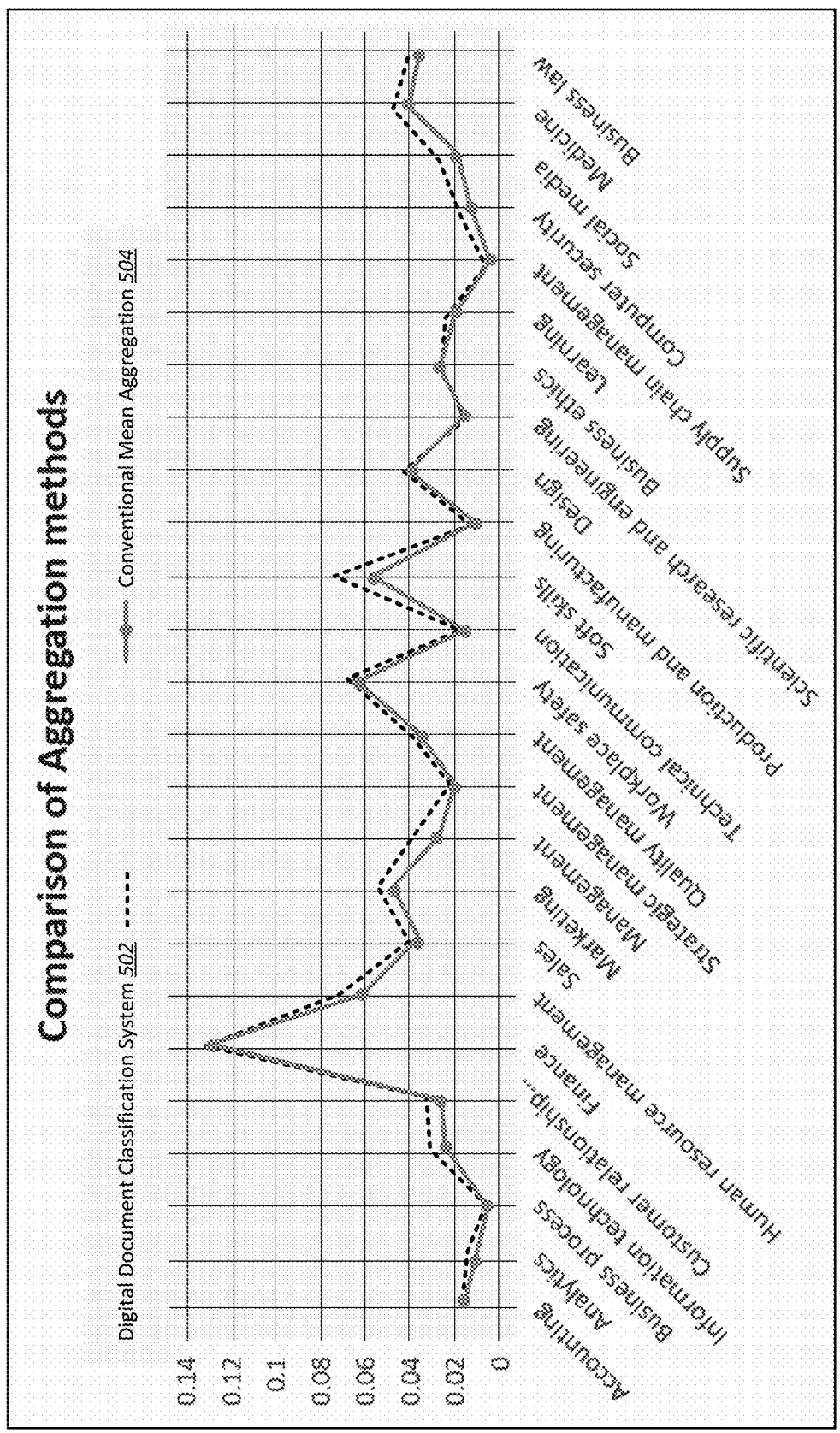
FIG. 5 illustrates experimental results of applying the digital document classification system in accordance with one or more embodiments.

As mentioned previously, by generating an aggregated category score for an electronic document based on positive trigger segments and positive trigger ratios, the digital document classification system 106 can more accurately determine a category (or classification) for an electronic document. For instance, FIG. 5 illustrates experimental results from applying the digital document classification system 106 in accordance with one or more embodiments. In particular, six hundred and eighteen documents were evaluated by a text classifier to determine categories for the six hundred and eighteen documents (which included books, websites, and blogs). FIG. 5 illustrates a comparison (e.g., based on AB testing) between the number of true positive classifications resulting from the aggregation method of the digital document classification system 106 (e.g., plot line 502) and true positive classifications resulting from a conventional mean aggregation (e.g., plot line 504) for the outputs of the text classifier. Specifically, the Y-axis in the chart illustrated in FIG. 5 illustrates number of true positive classifications for a category over the six hundred and eighteen documents evaluated. As shown in FIG. 5, the aggregation method of the digital document classification system 106 resulted in more true positive classifications for the evaluated documents across various document categories.

Figure 6:
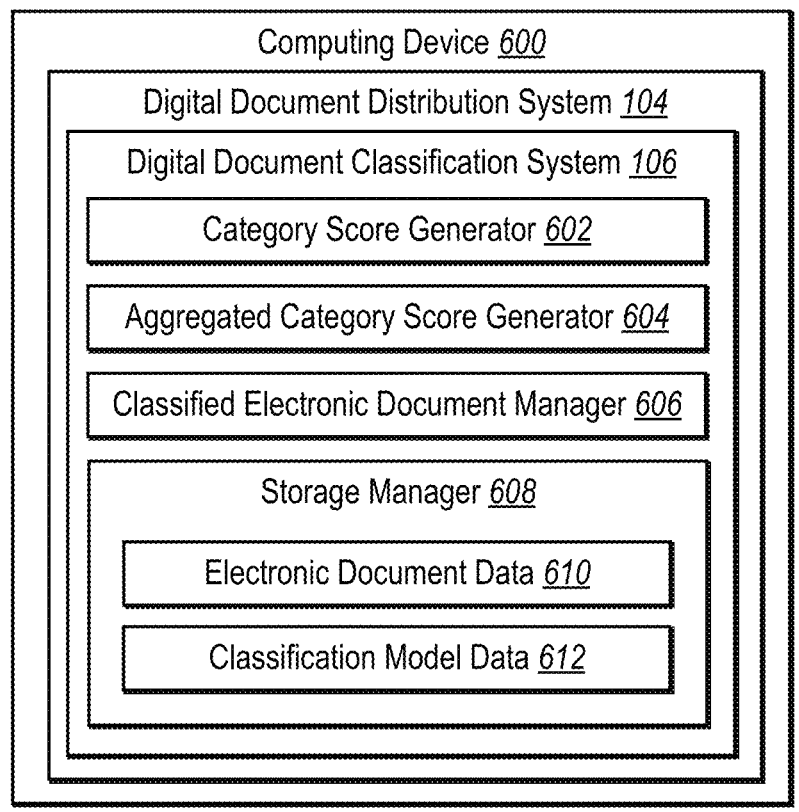
FIG. 6 illustrates a schematic diagram of a digital document classification system in accordance with one or more embodiments.

Turning now to FIG. 6, additional detail will be provided regarding components and capabilities of one embodiment of the digital document classification system. In particular, FIG. 6 illustrates an embodiment of an example digital document classification system 106 executed by a computing device 600 (e.g., the server device(s) 102, the administrator device 112, and/or the client device 110). As shown by the embodiment in FIG. 6, the computing device 600 can include or host the digital document distribution system 104 and the digital document classification system 106. The digital document classification system 106 can include a category score generator 602, an aggregated category score generator 604, a classified electronic document manager 606, and a storage manager 608 which can include electronic document data 610 and classification model data 612.

As just mentioned, and as illustrated in the embodiment in FIG. 6, the digital document classification system 106 can include a category score generator 602. For instance, the category score generator 602 can receive electronic documents, divide (or break up) electronic documents into a plurality of segments, and/or generate one or more category scores for the plurality of segments as described above (e.g., in relation to FIG. 3A). Additionally, the category score generator 602 can include one or more classification models (e.g., a neural network-based classifier) to generate the one or more category scores for the plurality of segments.

Furthermore, as shown in FIG. 6, the digital document classification system 106 can include the aggregated category score generator 604. For example, the aggregated category score generator 604 can generate an aggregated category score for an electronic document based on positive trigger segments and/or positive trigger ratios. In particular, the aggregated category score generator 604 can generate an aggregated category score for an electronic document based on positive trigger segments and/or positive trigger ratios as described above (e.g., in relation to FIGS. 2 and 3A-3C). Additionally, the aggregated category score generator 604 can utilize an aggregated category score to classify an electronic document.

In addition, as shown in FIG. 6, the digital document classification system 106 can include a classified electronic document manager 606. For instance, the classified electronic document manager 606 can distribute electronic documents based on aggregated category scores associated with the electronic documents as described above (e.g., in relation to FIG. 4).

Furthermore, as illustrated in FIG. 6, the digital document classification system 106 can include the storage manager 608. The storage manager 608 can maintain data to perform the one or more functions of the digital document classification system 106. As illustrated, the storage manager 608 can include electronic document data 610 (e.g., one or more electronic documents, segments of electronic documents, identified positive trigger segments of electronic documents, and/or aggregated category scores for electronic documents) and classification model data 612 (e.g., text classifier components and/or predicted category scores).

Each of the components 602-612 of the computing device 600 (e.g., the computing device 600 implementing the digital document classification system 106), as shown in FIG. 6, may be in communication with one another using any suitable communication technologies. It will be recognized that although components 602-612 of the computing device 600 are shown to be separate in FIG. 6, any of components 602-612 may be combined into fewer components, such as into a single facility or module, divided into more components, or configured into different components as may serve a particular embodiment.

The components 602-612 of the computing device 600 can comprise software, hardware, or both. For example, the components 602-612 can comprise one or more instructions stored on a computer-readable storage medium and executable by processors of one or more computing devices. When executed by the one or more processors, the computer-executable instructions of the digital document classification system 106 (e.g., via the computing device 600) can cause a client device and/or a server device to perform the methods described herein. Alternatively, the components 602-612 and their corresponding elements can comprise hardware, such as a special purpose processing device to perform a certain function or group of functions. Additionally, the components 602-612 can comprise a combination of computer-executable instructions and hardware.

Furthermore, the components 602-612 of the digital document classification system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 602-612 may be implemented as a stand-alone application, such as a desktop or mobile application. Furthermore, the components 602-612 may be implemented as one or more web-based applications hosted on a remote server. The components 602-612 may also be implemented in a suite of mobile device applications or "apps." To illustrate, the components 602-612 may be implemented in an application, including but not limited to, ADOBE® DOCUMENT CLOUD, ADOBE® CAPTIVATE® PRIME, ADOBE® ANALYTICS CLOUD, ADOBE® ANALYTICS, ADOBE® AUDIENCE MANAGER, ADOBE® CAMPAIGN, ADOBE® EXPERIENCE MANAGER, and ADOBE® TARGET. "ADOBE," "ADOBE® DOCUMENT CLOUD," "ADOBE CAPTIVATE PRIME," "ADOBE ANALYTICS CLOUD," "ADOBE ANALYTICS," "ADOBE AUDIENCE MANAGER," "ADOBE CAMPAIGN," "ADOBE EXPERIENCE MANAGER," and "ADOBE TARGET" are either registered trademarks or trademarks of Adobe Inc. in the United States and/or other countries.

Figure 7:
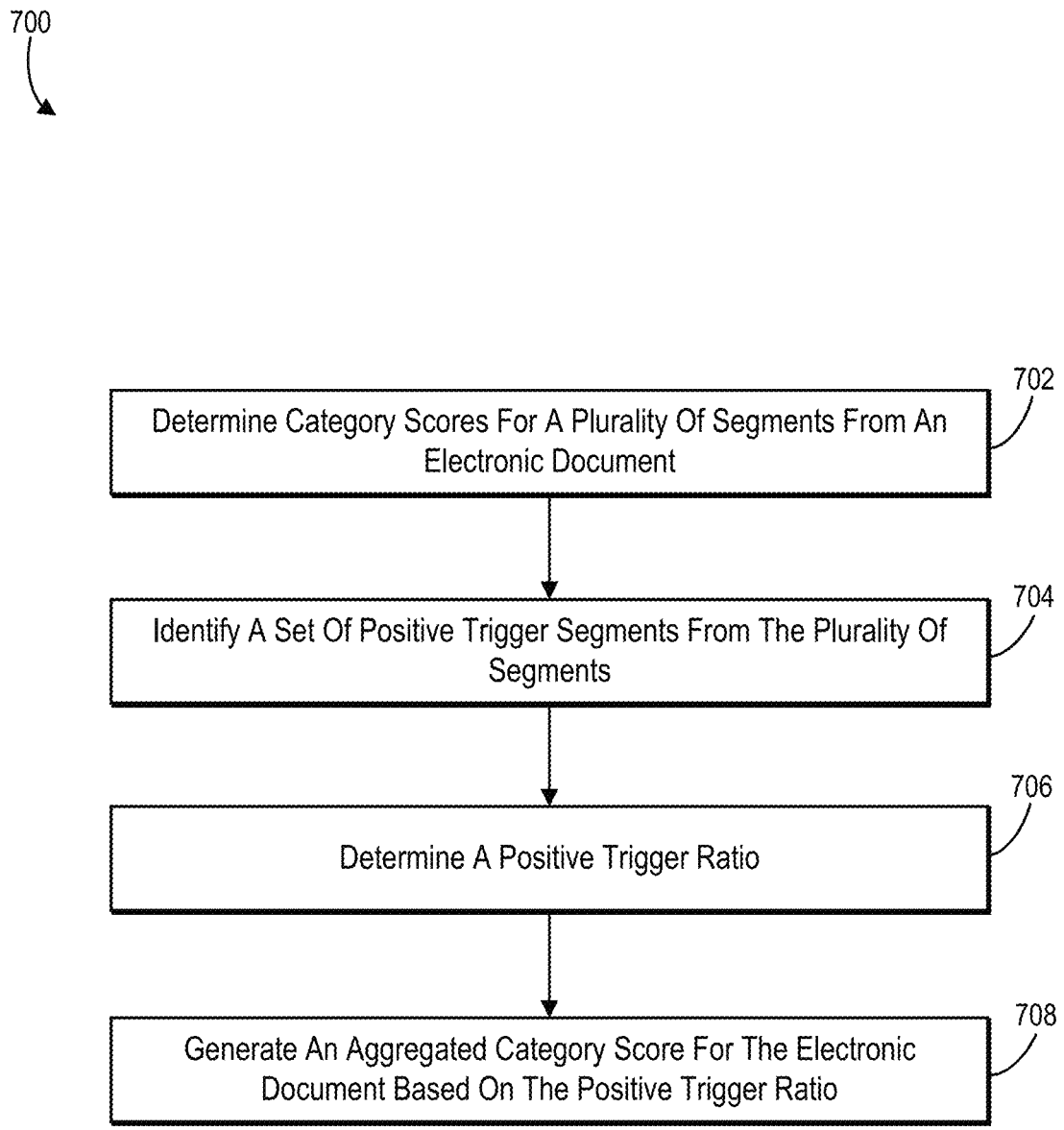
FIG. 7 illustrates a flowchart of a series of acts for generating aggregated category scores for electronic documents in accordance with one or more embodiments.

FIGS. 1-6, the corresponding text, and the examples provide a number of different methods, systems, devices, and non-transitory computer-readable media of the digital document classification system 106. In addition to the foregoing, one or more embodiments can also be described in terms of flowcharts comprising acts for accomplishing a particular result, as shown in FIG. 7. FIG. 7 may be performed with more or fewer acts. Further, the acts may be performed in differing orders. Additionally, the acts described herein may be repeated or performed in parallel with one another or parallel with different instances of the same or similar acts.

As mentioned above, FIG. 7 illustrates a flowchart of a series of acts 700 for generating aggregated category scores for electronic documents in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device to perform the acts of FIG. 7. In some embodiments, a system can perform the acts of FIG. 7.

As illustrated in FIG. 7, the series of acts 700 includes an act 702 of determining category scores for a plurality of segments from an electronic document. In particular, the act 702 can include utilizing a classification model to determine category scores for a plurality of segments from an electronic document. For instance, the category scores can correspond to a target category. Furthermore, the category scores can indicate likelihoods that segments from the plurality of segments correspond to a target category. Additionally, the classification model can include a neural network.

Moreover, the act 702 can include utilizing the classification model to determine additional category scores for the plurality of segments from the electronic document. For instance, the additional category scores can correspond to an additional target category. Furthermore, the additional category scores can indicate likelihoods that the segments from the plurality of segments correspond to an additional target category.

Additionally, the act 702 can include identifying an additional electronic document having a second length different than a first length of the electronic document. Moreover, the act 702 can include utilizing the classification model to determine additional category scores for an additional plurality of segments from the additional electronic document. For instance, the additional category scores can correspond to an additional target category. Furthermore, the additional category scores can indicate likelihoods that the additional plurality of segments correspond to an additional target category.

As illustrated in FIG. 7, the series of acts 700 includes an act 704 of identifying a set of positive trigger segments from the plurality of segments. In particular, the act 704 can include comparing the category scores (for a plurality of segments) to a threshold category score to identify a set of positive trigger segments from the plurality of segments. Moreover, the act 704 can include comparing the additional category scores to the threshold category score to identify an additional set of positive trigger segments from the plurality of segments. Furthermore, the act 704 can include identifying a set of positive trigger segments from the plurality of segments based on the category scores. Also, the act 704 can include identifying an additional set of positive trigger segments from the plurality of segments based on the additional category scores. For instance, the positive trigger segments can correspond to category scores that satisfy a threshold category score. The act 704 can also include determining the threshold category score based on one or more characteristics of the electronic document.

As illustrated in FIG. 7, the series of acts 700 includes an act 706 of determining a positive trigger ratio. In particular, the act 706 can include determining a positive trigger ratio based on the set of positive trigger segments and the plurality of segments. Moreover, the act 706 can include determining a number of positive trigger segments within the set of positive trigger segments. The act 706 can also include determining a number of segments within the plurality of segments. Additionally, the act 706 can also include determining the positive trigger ratio based on the number of positive trigger segments and the number of the segments. Furthermore, the act 706 can include determining an additional positive trigger ratio based on the additional set of positive trigger segments and the plurality of segments. The act 706 can also include determining at least one of the threshold positive trigger ratio or the threshold category score based on one or more characteristics of the electronic document.

As illustrated in FIG. 7, the series of acts 700 includes an act 708 of generating an aggregated category score for the electronic document based on the positive trigger ratio. In particular, the act 708 can include, in response to determining that the positive trigger ratio satisfies a threshold positive trigger ratio, generating an aggregated category score for the electronic document based on the set of positive trigger segments. The act 708 can also include generating the aggregated category score for the electronic document by determining an average of category scores corresponding to the set of positive trigger segments. Furthermore, the act 708 can include, in response to determining that the additional positive trigger ratio does not satisfy the threshold positive trigger ratio, generating an additional aggregated category score corresponding to the additional target category for the electronic document based on the plurality of segments. Additionally, the act 708 can include, in response to determining that none of the additional category scores satisfy the threshold category score, generating an additional aggregated category score corresponding to the additional target category for the electronic document based on the plurality of segments. Moreover, the act 708 can include, generating an additional aggregated category score for the additional electronic document based on the threshold category score and the threshold positive trigger ratio.

Moreover, the act 708 can include providing the electronic document (or digital content corresponding to the electronic document) to a client device based on the aggregated category score. Additionally, the act 708 can include determining a category corresponding to a user of the client device. Moreover, the act 708 can include, in response to determining a correspondence between the target category and the category corresponding to the user of the client device, providing the electronic document to the client device.

In addition to (or in the alternative to) the acts above, the series of acts 700 can also include a step for generating an aggregated category score for the electronic document from positive trigger segments of the plurality of segments that satisfy a threshold positive trigger ratio. For example, the acts and algorithms described above in relation to FIG. 2 (e.g., the acts 202-212) can comprise the corresponding acts and algorithms (i.e., structure) for performing a step for generating an aggregated category score for an electronic document from positive trigger segments of a plurality of segments that satisfy a threshold positive trigger ratio.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 8:
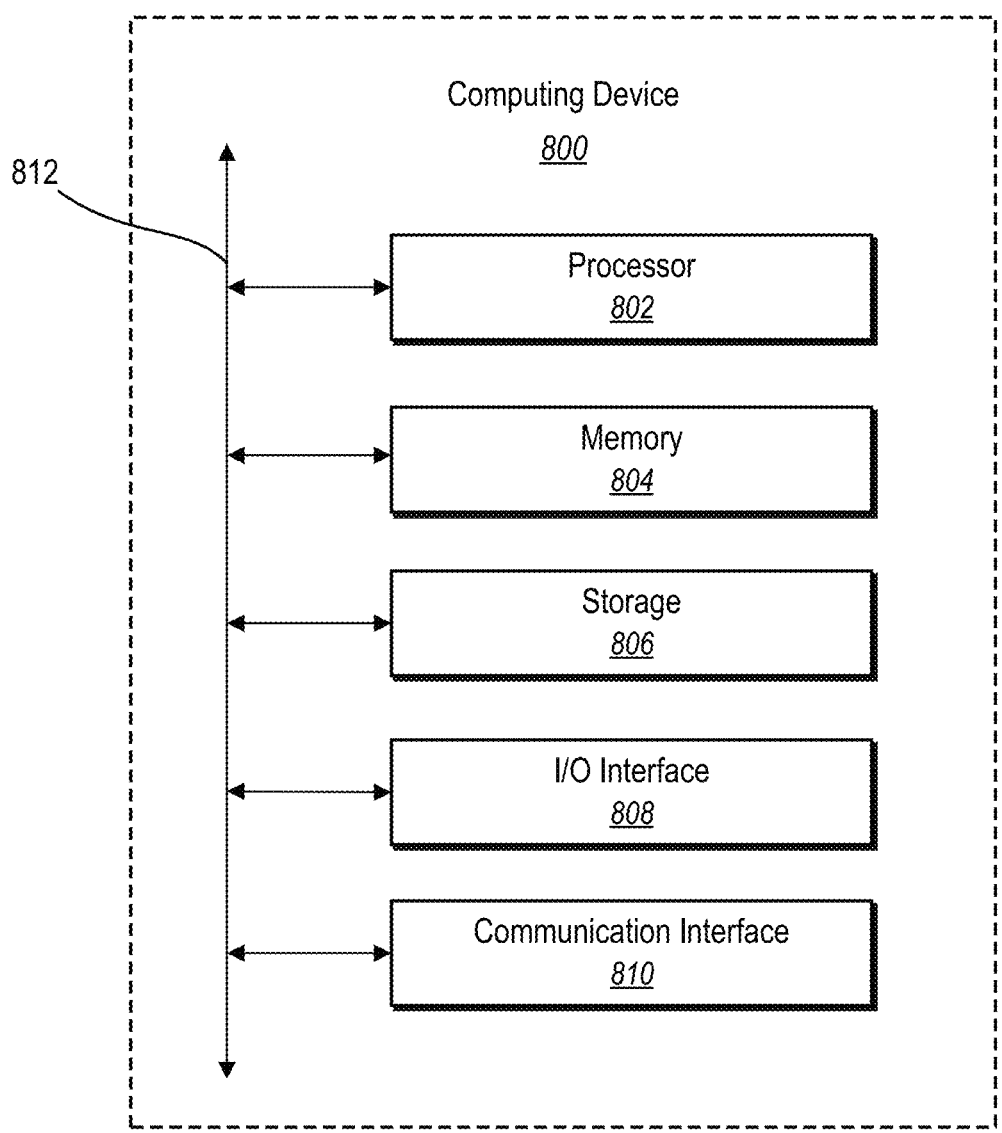
FIG. 8 illustrates a block diagram of an example computing device in accordance with one or more embodiments.

FIG. 8 illustrates a block diagram of an example computing device 800 that may be configured to perform one or more of the processes described above. One will appreciate that one or more computing devices, such as the computing device 800 may represent the computing devices described above (e.g., computing device 600, server device(s) 102, and client device 110). In one or more embodiments, the computing device 800 may be a mobile device (e.g., a mobile telephone, a smartphone, a PDA, a tablet, a laptop, a camera, a tracker, a watch, a wearable device, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of computing device 800 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computer system to:
   utilize a classification model to determine a set of category scores for a plurality of segments from an electronic document, wherein the set of category scores indicate likelihoods that segments from the plurality of segments correspond to a target category;
   compare category scores from the set of category scores to a threshold category score to identify a set of positive trigger segments from the plurality of segments;
   determine a positive trigger ratio based on the set of positive trigger segments and the plurality of segments;
   in response to determining that the positive trigger ratio satisfies a threshold positive trigger ratio, generate an aggregated category score for the electronic document based on a subset of category scores corresponding to the set of positive trigger segments from the set of category scores; and
   in response to determining that an additional positive trigger ratio from additional category scores of an additional target category does not satisfy the threshold positive trigger ratio, generate an additional aggregated category score corresponding to the additional target category for the electronic document based on the additional category scores corresponding to the plurality of segments.

2. The non-transitory computer-readable medium of claim 1, further comprising instructions that, when executed by the at least one processor, cause the computer system to provide the electronic document or digital content corresponding to the electronic document to a client device based on the aggregated category score.

3. The non-transitory computer-readable medium of claim 1, further comprising instructions that, when executed by the at least one processor, cause the computer system to utilize the classification model to determine the additional category scores for the plurality of segments from the electronic document, wherein the additional category scores indicate likelihoods that the segments from the plurality of segments correspond to the additional target category.

4. The non-transitory computer-readable medium of claim 3, further comprising instructions that, when executed by the at least one processor, cause the computer system to:
   compare the additional category scores to the threshold category score to identify an additional set of positive trigger segments from the plurality of segments; and
   determine the additional positive trigger ratio based on the additional set of positive trigger segments and the plurality of segments.

5. The non-transitory computer-readable medium of claim 1, further comprising instructions that, when executed by the at least one processor, cause the computer system to determine a category classification for the electronic document based on a comparison between the aggregated category score and the additional aggregated category score.

6. The non-transitory computer-readable medium of claim 1, wherein determining the positive trigger ratio based on the set of positive trigger segments and the plurality of segments further comprises:
   determining a number of positive trigger segments within the set of positive trigger segments;
   determining a number of segments within the plurality of segments; and
   determining the positive trigger ratio based on the number of positive trigger segments and the number of segments.

7. The non-transitory computer-readable medium of claim 1, further comprising instructions that, when executed by the at least one processor, cause the computer system to determine at least one of the threshold positive trigger ratio or the threshold category score based on one or more characteristics of the electronic document.

8. The non-transitory computer-readable medium of claim 1, further comprising instructions that, when executed by the at least one processor, cause the computer system to:
   identify an additional electronic document having a second length different than a first length of the electronic document;
   utilize the classification model to determine additional category scores for an additional plurality of segments from the additional electronic document, wherein the additional category scores indicate likelihoods that the additional plurality of segments correspond to an additional target category; and
   generate an additional aggregated category score for the additional electronic document based on the threshold category score and the threshold positive trigger ratio.

9. The non-transitory computer-readable medium of claim 1, further comprising instructions that, when executed by the at least one processor, cause the computer system to generate the aggregated category score for the electronic document by determining an average of category scores from the subset of category scores corresponding to the set of positive trigger segments.

10. The non-transitory computer-readable medium of claim 1, wherein the classification model comprises a neural network.

11. In a digital medium environment for distribution of electronic documents across client devices, a system comprising:
   at least one processor; and
   at least one non-transitory computer-readable storage medium storing instructions that, when executed by the at least one processor, cause the system to:
      utilize a classification model to determine a set of category scores for a plurality of segments from an electronic document, wherein the set of category scores correspond to a target category;
      compare category scores from the set of category scores to a threshold category score to identify a set of positive trigger segments from the plurality of segments;
      determine a positive trigger ratio based on the set of positive trigger segments and the plurality of segments;
      in response to determining that the positive trigger ratio satisfies a threshold positive trigger ratio, generate an aggregated category score for the electronic document based on a subset of category scores corresponding to the set of positive trigger segments from the set of category scores; and
      in response to determining that an additional positive trigger ratio from additional category scores of an additional target category does not satisfy the threshold positive trigger ratio, generate an additional aggregated category score corresponding to the additional target category for the electronic document based on the additional category scores corresponding to the plurality of segments.

12. The system of claim 11, further comprising instructions that, when executed by the at least one processor, cause the system to provide the electronic document or digital content corresponding to the electronic document to a client device based on the aggregated category.

13. The system of claim 11, further comprising instructions that, when executed by the at least one processor, cause the system to utilize the classification model to determine the additional category scores for the plurality of segments from the electronic document, wherein the additional category scores indicate likelihoods that the segments from the plurality of segments correspond to the additional target category.

14. The system of claim 11, further comprising instructions that, when executed by the at least one processor, cause the system to:
   identify an additional set of positive trigger segments from the plurality of segments based on the additional category scores and the threshold category score; and
   determine the additional positive trigger ratio based on the additional set of positive trigger segments and the plurality of segments.

15. The system of claim 11, further comprising instructions that, when executed by the at least one processor, cause the system to:
   determine a third set of category scores for the plurality of segments from the electronic document, wherein the third set of category scores correspond to a third target category; and
   in response to determining that no category scores from the third set of category scores satisfy a threshold category score, generate third aggregated category score corresponding to the third target category for the electronic document based on the plurality of segments.

16. The system of claim 11, further comprising instructions that, when executed by the at least one processor, cause the system to:
   identify an additional electronic document having a second length different than a first length of the electronic document;
   utilize the classification model to determine a third set of category scores for an additional plurality of segments from the additional electronic document, wherein the third set of category scores correspond to the target category; and
   generate an third aggregated category score for the additional electronic document based on a threshold category score and the threshold positive trigger ratio.

17. The system of claim 11, wherein determining the positive trigger ratio based on the set of positive trigger segments and the plurality of segments comprises:
   determining a number of positive trigger segments within the set of positive trigger segments;
   determining a number of segments within the plurality of segments; and determining the positive trigger ratio based on the number of positive trigger segments and the number of segments.

18. A computer-implemented method for determining content categories utilizing classification machine learning models, the computer-implemented method comprising:
   utilizing a classification model to determine a set of category scores for a plurality of segments from an electronic document, wherein the set of category scores indicate likelihoods that segments from the plurality of segments correspond to a target category;
   comparing category scores from the set of category scores to a threshold category score to identify a set of positive trigger segments from the plurality of segments;
   determining a positive trigger ratio based on the set of positive trigger segments and the plurality of segments;
   in response to determining that the positive trigger ratio satisfies a threshold positive trigger ratio, generating an aggregated category score for the electronic document based on a subset of category scores corresponding to the set of positive trigger segments from the set of category scores; and
   in response to determining that an additional positive trigger ratio from additional category scores of an additional target category does not satisfy the threshold positive trigger ratio, generating an additional aggregated category score corresponding to the additional target category for the electronic document based on the additional category scores corresponding to the plurality of segments.

19. The computer-implemented method of claim 18, further comprising determining a category classification for the electronic document based on a comparison between the aggregated category score and the additional aggregated category score.

20. The computer-implemented method of claim 18, further comprising:
   determining a category corresponding to a user of a client device; and
   in response to determining a correspondence between the target category and the category corresponding to the user of the client device based on the aggregated category score, providing the electronic document to the client device.

* * * * *